United States Patent

Vladkov

[11] Patent Number: 4,918,525
[45] Date of Patent: Apr. 17, 1990

[54] METHOD AND DEVICE FOR PRECISION SYNC PULSES SEPARATION

[75] Inventor: Emil P. Vladkov, Sofia, Bulgaria

[73] Assignee: Bulgarska Televisia Kam Komitet Sa Televisia I Radio, Sofia, Bulgaria

[21] Appl. No.: 310,368

[22] Filed: Feb. 13, 1989

[30] Foreign Application Priority Data

Feb. 24, 1988 [BG] Bulgaria .................................. 83105

[51] Int. Cl.⁴ .............................................. H04N 5/08
[52] U.S. Cl. ..................................... 358/153; 358/148
[58] Field of Search ................ 358/153, 148; 328/115, 328/116, 117, 139

[56] References Cited

U.S. PATENT DOCUMENTS 3,699,256 10/1972 Roth ..................................... 358/153
4,233,629 11/1980 Dayton ................................. 358/153

OTHER PUBLICATIONS

Hedlund, Lee V. "A Self Starting and Clamping Sync Separator for Television Signals" RCA TN No. 709 6/67.
AMPEX TBC-3, Catalog No. 1809636-01 issued Feb. 1985 (401 Broadway, Redwood City, CA 94063.

Primary Examiner—James J. Groody
Assistant Examiner—David E. Harvey
Attorney, Agent, or Firm—Herbert Dubno

[57] ABSTRACT

A method based on clamping of composite video signals on sync level and on level black, summation of the two differently clamped signals and comparing with the constant clamping level. Processing is simplified and the slicing precision is improved. The device includes two clamping units (1, 2), and adder (3) and a level comparator (4).

4 Claims, 2 Drawing Sheets

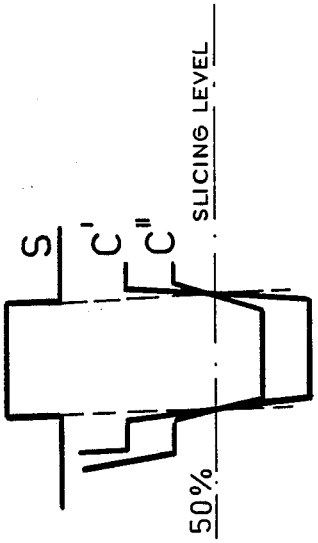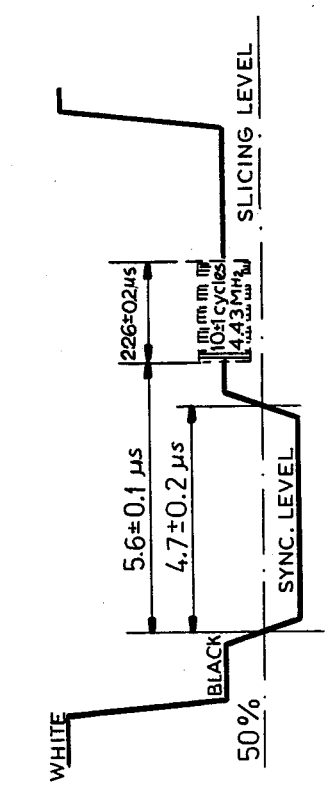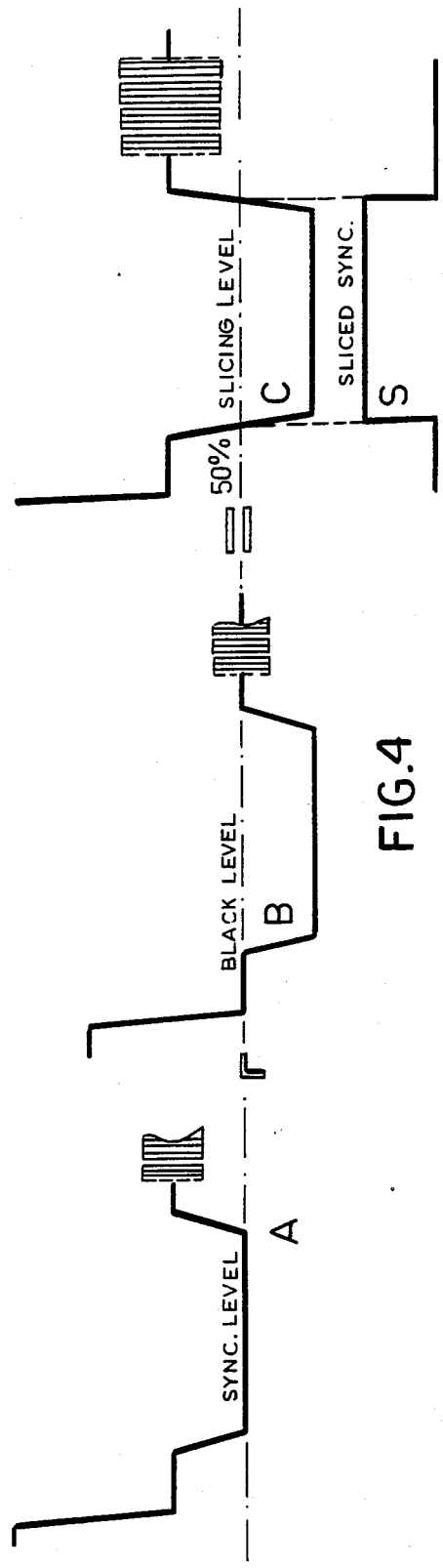

METHOD AND DEVICE FOR PRECISION SYNC PULSES SEPARATION

FIELD OF THE INVENTION

My present invention relates to a method of and a device for precision separation of synchronization pulses for use in television broadcasting equipment and in some specialized TV technology applications.

BACKGROUND OF THE INVENTION

A well-known method of precision synchronization pulse separation is described in AMPEX, TBC-3, CAT. NO. 1809636-01, February 1985, 401 Broadway, where the composite videosignal is filtered by the color carrier, after which it is compared with the trimming level—50% sync, produced by level black detection and level sync detection as a mean value of both.

A disadvantage of the known method is its complex technical implementation since it requires a number of supplementary processings steps such as rough sync pulse separation, key detection by memorizing the levels determining the sync signal amplitude, and termination of the key detections of levels during the attenuation intervals by frames, in drop-outs and pulse noises. The latter demands level averaging for larger time intervals, which reduces the separation precision. This precision is reduced to a certain extent also by the need for preliminary frequency signal filtration related to the shifting of the front, or the separated sync pulses, respectively.

There is a well known device for the implementation of the well-known method I1I consisting of a filter for the color carrier connected by its output to one of the inputs of a level comparator and simultaneously to the input of a rough sync selector—about 25% with respect of level black, the output of which is connected to two key pulse shapers—for sync peak and for rear platform connected to the key inputs of two dynamic sample/-hold memories. The signal inputs of the latter are connected to the output of the color carrier filter and their outputs are connected to the inputs of an adder. The latter's output is coupled to the second input of the level comparator the output of which is an output of the sync separator. The disable input of the rough sync separator is connected to the output of frame blanking pulse shapers and apply the drop-out disable pulse across an OR gate.

A disadvantage of this device is its high degree of complexity and reduced precision as a result of a need for dynamic memory with large-value time constants. The system also gives rise to a deformation of the sync fronts as a result of high frequency filtration.

Another somewhat simplified device implementing the well-known I2I method is also known and is designed for incorporation in integrated sync processors. This device has a limiter—sync separator, by a detector at level black connected to a second detector at level sync, the output of which is connected to one of the inputs of a differential amplifier, across the second input of which is connected the composite sync signal, its output being an output of the device.

A disadvantage of this device is its low precision due to the need to use large time-constants for the level detectors. This makes its application for professional needs inadequate.

OBJECT OF THE INVENTION

The object of this invention is to provide an improved method of and a device for precision synchronization pulse separation having improved separation precision and a simplified, but simultaneously more stable technical realization.

This object is attained by a method for precision sync pulse separation where clamping of the composite videosignal is made both by level sync (sync pulse peak) and level black after which the two clamped signals are summed and the summation result is compared with the clamping level where the output sync pulses are shaped. The device of the invention for synchronization pulse precision separation has the level black clamping unit and at the same time to the input of a level sync clamping unit, and the outputs of the two clamping units are connected to the two inputs of an adder, respectively, the output of which is connected, in turn, to one of the inputs of a level comparator, the other input of which is connected to a reference level equal to the clamping level. The output of the level comparator is an output of the device.

In an alternative of the sync pulse precision separation device, the level black clamping unit is connected to the respective adder input across an electronic switch, the control input of which is connected to the output of a second level comparator, one of the inputs of which is connected to the output of the level black clamping unit. The output of the first comparator is connected across a pulse shaper for clamping with the pulse input of the level black clamping unit. It is also possible for the second comparator output to be connected to an input for controlling the reference voltage unit of the first comparator.

An advantage of the method and device for sync pulse precision separation is the improved separation precision accompanied by simplified realization and higher stability.

BRIEF DESCRIPTION OF THE DRAWING

The above and other objects, features and advantages of my invention will become more readily apparent from the following description, reference being made to the accompanying highly diagrammatic drawing in which:

FIG. 3 is a waveform diagram of the standard shape of the complex videosignal, e.g. according to the recommendation of CCIR-PAL B/G, popular on the European continent;

FIG. 4 is a signal diagram in the sync selection process; and

FIG. 5 shows diagrams illustrating the stability of the sync selection to the sync signal amplitude fluctuations.

SPECIFIC DESCRIPTION

Figure 1:
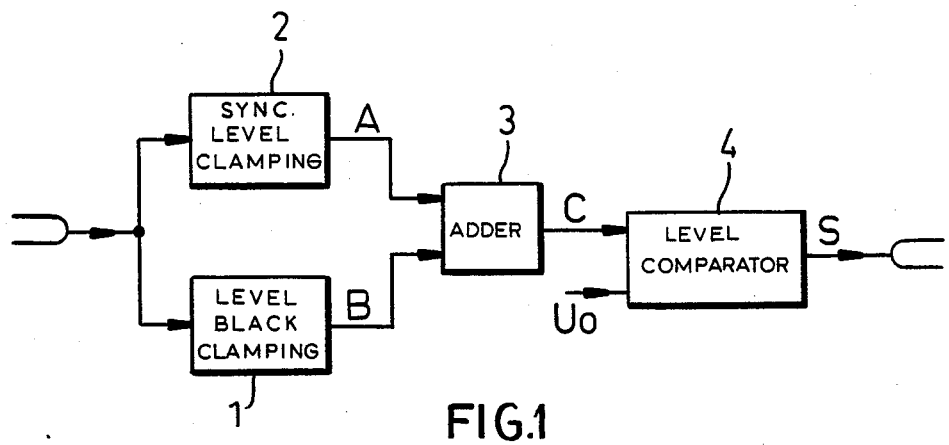
FIG. 1 is a block diagram of the device carrying out the method of the invention.

The input of the sync pulse precision separation device (FIG. 1) is supplied with the composite television signal and is connected to the input of the level black clamping unit 1 and the input of sync level clamping unit 2. The outputs of the two clamping units 1,2 are connected to the two inputs of adder 3, respectively, the output of which is connected to one of the inputs of level comparator 4, reference level $U_o$ being connected to the other input equal to the clamping level. The output of comparator 4 is an output of the device.

Figure 2:
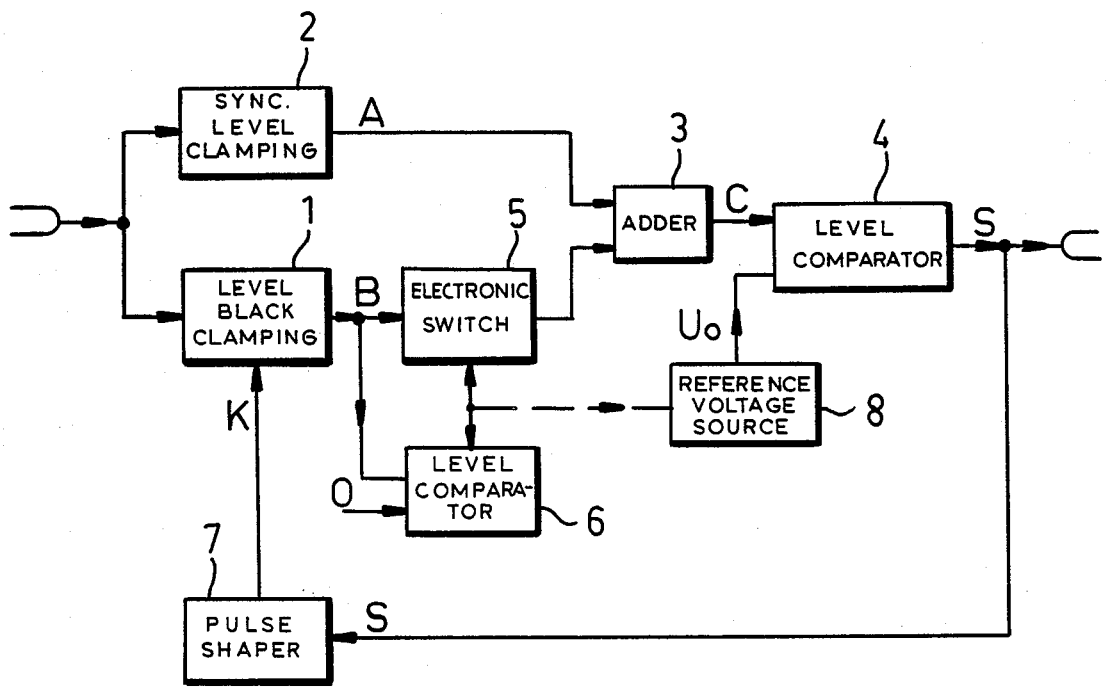
FIG. 2 is a block diagram of another embodiment of the device.

In the second embodiment, shown in FIG. 2, the level black clamping unit 1 is connected to the respective input of adder 3 across an electronic switch 5, the control input of which is connected to the output of a second comparator 6. One of the inputs of comparator 6 is connected to the output of the level black clamping unit 1, its other input being supplied with reference voltage equal to the clamping level. The output of the first comparator 4 is connected across a clamping pulse shaper 7 to the pulse input of the level black unit 1. The possibility of a connection between the output of the second level comparator 6 and the input of the reference voltage unit control 8 of the first comparator 4 is shown by a broken line.

The sync separator operates as follows:

The complex television signal (FIG. 3) is clamped to DC level $U_o$, e.g. zero, according to sync level in unit 1, signal A, and level black signal B in unit 2. The two clamped signals but shifted by swing level are summed in unit 3. The summation signal $A+B=C$ (FIG. 4) is clamped at level $U_o$ which is the level of FIG. 4. Sync signal 5 is derived from the comparison of the summation signal C and reference level $U_o$, the fronts of which correspond to the clamping level. Upon changing of the swing of sync signal C across the input due to its clamping by sync 100% signal A and sync 0% signal B, the summation signal C remaines clamped at level 50% of reference level, e.g. zero, and the separated signal S does not change, i.e. its front is not shifted. This is illustrated in FIG. 5 by the two C' and C" sync signals, different in swing. In standard color signal levels in the complex television signal the trimming (slicing) level $U_o$ affects the color signal (FIGS. 3 and 4) and no filtration of the input signal is required which improves the precision of the sync pulse separation. If nevertheless higher levels of the color carrier are required, or a change of the slicing level in the field below 50% is decided, partial filtration in the frequency region of the color carrier is possible. It is also possible that it can be made together with the summation of signals A and B, or after it. In any case such partial filtration which is not aimed at the comprehensive suppression of the color signal which is a prerequisite in the traditional method, affects the precision of the separation but to a considerable smaller degree. Any slicing level change below or above 50% sync, if necessary, can be made only by changing the level $T_o$ for comparing the summation signal C, in plus or minus direction. The method, together with its high precision and simple realization, according to this invention, has the advantage of including in the signal processing a level black clamping, a type of processing widely used in television equipment which enables its utilization for the purposes of precision sync separation.

The embodiment of the device shown in FIG. 2 illustrates the potential of using the sync signal S given at the output for shaping the clamping signal in the level black clamping unit 1. When the input signal is switched or in the device in operation, the level black clamping unit 1 shall not have established its normal operation, its connection to adder 3 is discontinued by electronic switch 5. Then only sync signal A fixed by the level at the input of the level comparator 4 will be applied to adder 3.

The comparator will slice signal A at level 100%, or just under 100% sync, as guaranteed by selection of its reference level $U_o$. The level black clamping unit 1 receives clamping controlling pulses K from the signal S freed across the output by means of the key pulse shaper 7 for clamping. After signal B is established at level black on the clamping level $U_o$, the second separator 6 adjusted on the same level, for example O, shall change its output level and switches, by electronic switch 5, the level-clamped level black signal B to the input of adder 3 thus the device is brought into normal operating mode. At very high precision rates, during the start-up interval the reference voltage $U_o$ can be controlled as illustrated by the broken line connection to the control. The second comparator 6 in this case guarantees, by its output level in the start-up interval, by means of reference level control unit 8, about 50% slicing sync only for the 100% clamped sync signal A. In normal operating mode the reference level is settled at $U_o$ corresponding to 50% sync for the summation signal C. It is also possible to use a delay relay in place of second comparator 6 controlled by the input signal and the supply sync separator voltage.

I claim:

1. A method of precision synchronization pulse separation which comprises the steps of:
   (a) clamping a composite video signal at a sync level to produce a sync level clamped output;
   (b) simultaneously clamping said composite video signal at a level black level to produce a level black clamped output;
   (c) summing said clamped outputs to produce a summation signal; and
   (d) comparing said summation signal with a reference signal in a level comparator to produce output synch pulses.

2. A device for precision synchronization pulse separation which comprises:
   a sync clamping unit receiving a composite video signal for clamping said composite video signal at a sync level to produce a sync level clamped output;
   a level black clamping unit receiving said composite video signal for simultaneously clamping said composite video signal at a level black level to produce a level black clamped output;
   an adder having inputs connected to both of said units for summing said clamped outputs to produce a summation signal; and
   a level comparator having an input connected to said adder and receiving said summation signal and another input connected to a source of a reference signal at a level equal to a clamping level for comparing said summation signal with said reference signal to produce output sync pulses.

3. The device defined in claim 2, further comprising:
   an electronic switch connected between said level black clamping unit and said adder and having a control input;
   a second level comparator having an output connected to said control input, an input connected to said output of said level black clamping unit, and another input connected to a reference voltage equal to said clamping level; and
   a clamping pulse shaper having an input connected to receive said output sync pulses and an output connected to a pulse input of said level black clamping unit.

4. The device defined in claim 3 wherein said output of said second level comparator is connected to a control input of said source.

* * * * *